United States Patent
Akahori

(10) Patent No.: US 7,940,892 B2
(45) Date of Patent: May 10, 2011

(54) ENERGY SUBSTRACTION METHOD AND APPARATUS

(75) Inventor: Sadato Akahori, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 15 days.

(21) Appl. No.: 12/453,507

(22) Filed: May 13, 2009

(65) Prior Publication Data

US 2009/0285361 A1 Nov. 19, 2009

(30) Foreign Application Priority Data

May 14, 2008 (JP) ................................. 2008-127269

(51) Int. Cl.
*H05G 1/64* (2006.01)
(52) U.S. Cl. .......................... 378/98.11; 378/8; 382/130
(58) Field of Classification Search ............ 378/8, 98.11
See application file for complete search history.

(56) References Cited

U.S. PATENT DOCUMENTS

| | | | | | |
|---|---|---|---|---|---|
| 4,482,918 | A | * | 11/1984 | Keyes et al. ................. | 378/98.11 |
| 5,034,988 | A | * | 7/1991 | Fujiwara ....................... | 382/130 |
| 6,643,536 | B2 | | 11/2003 | Nicolas et al. | |
| 6,661,873 | B2 | | 12/2003 | Jabri et al. | |
| 2001/0002934 | A1 | * | 6/2001 | Oosawa ........................ | 382/130 |
| 2001/0048757 | A1 | * | 12/2001 | Oosawa ........................ | 382/130 |
| 2002/0087074 | A1 | * | 7/2002 | Nicolas et al. ................. | 600/427 |
| 2002/0097901 | A1 | * | 7/2002 | Xu et al. ........................ | 382/131 |
| 2003/0142787 | A1 | * | 7/2003 | Jabri et al. .................. | 378/98.12 |
| 2003/0169848 | A1 | * | 9/2003 | Jabri et al. ..................... | 378/98.9 |
| 2004/0081280 | A1 | * | 4/2004 | Avinash ..................... | 378/98.9 |
| 2005/0047635 | A1 | * | 3/2005 | Oosawa et al. ............... | 382/130 |
| 2005/0185830 | A1 | * | 8/2005 | Sasada .......................... | 382/130 |

FOREIGN PATENT DOCUMENTS

| | | |
|---|---|---|
| JP | 2002-325756 | 11/2002 |
| JP | 2003-244542 | 8/2003 |
| JP | 2006-175057 | 7/2006 |

* cited by examiner

*Primary Examiner* — Edward J Glick
*Assistant Examiner* — Alexander H Taningco
(74) *Attorney, Agent, or Firm* — Jean C. Edwards, Esq.; Akerman Senterfitt LLP

(57) ABSTRACT

The energy subtraction apparatus of the present invention comprises an image input device which inputs two or more different kinds of radiographic images having been taken by irradiating a subject with radiation rays with different radiation qualities, an information of body part acquisition device which designates a information of body part, a motion compensation processing device which performs a registration process by compensating for shift between corresponding points between the two or more different kinds of radiographic images due to movement of the subject, a subtraction device which performs an energy subtraction process on the two or more different kinds of radiographic images, and an operation mode switching device which switches an operation mode of the registration process at the motion compensation processing device depending on the information of body part.

10 Claims, 4 Drawing Sheets

ENERGY SUBSTRACTION METHOD AND APPARATUS

CROSS-REFERENCE TO RELATED APPLICATIONS

The present application claims priority from Japanese Patent Application No. 2008-127269, filed May 14, 2008, the contents of which are herein incorporated by reference in their entirety.

BACKGROUND OF THE INVENTION

1. Field of the Invention

The present invention relates to an energy subtraction method and an energy subtraction apparatus, and in particular, relates to a technique for applying a method of acquiring energy subtraction images by taking at least two or more kinds of radiographic images at different radiation energy levels to radiography of various parts.

2. Description of the Related Art

Conventionally, there is an energy subtraction technology known as a kind of technology with which radiations with different energy distributions are applied to one and the same subject to shoot at least two or more kinds of radiographic images at different radiation energy levels, and then the radiographic images are taken as digital image signals to have respective pixels matched between the respective images and weighted to go through a subtraction process, whereby images exhibiting distributions of substances with particular radiation absorption characteristics can be acquired.

Particularly, a dual-energy subtraction technique using two images are well known in the art. With this technique, for example, it is possible to produce an image with bone image eliminated or soft tissue image eliminated from the imaged subject that includes both the bones and soft tissue.

Conventionally, accumulative phosphor sheets have been used in taking radiographic images. The accumulative phosphor sheet is accumulative phosphor that takes a form of a sheet, the accumulative phosphor being able to accumulate some of the radiation energy from the applied radiation, and later, in response to irradiation with excitation light such as visible light, or the like, exhibit photostimulable emission depending on the accumulated energy.

As a method of acquiring two radiographic images to be involved in a subtraction process in a case of performing the energy subtraction process using the accumulative phosphor sheets, there are two kinds which are generally known, one being a single-exposure scheme and the other being a two-exposure scheme.

In the single-exposure scheme, two accumulative phosphor sheets with a radiation separation filter such as a copper plate, or the like formed in between, or two accumulative phosphor sheets with different radiation absorption characteristics are stacked, and these two sheets are exposed at the same time with a single radiation irradiation, whereby both of the sheets will turn as though they have been irradiated with radiations with different radiation energy distributions in a single exposure.

In the two-exposure scheme, two accumulative phosphor sheets are used alternately for each exposure such that they are irradiated with radiations with two different radiation energy distributions (e.g. radiations at high energy and low energy), respectively, in two exposures.

Meanwhile, recently, a flat panel X-ray detector (FPD), where an enormous number of X-ray detecting elements using semiconductors, or the like, are arranged in a matrix in an X-ray detection surface, has come into use. With a single FPD, it is possible to take images as many times as needed. From a perspective that energy degree of freedom of radiation to apply is high, and good decomposed tissue images are easily obtainable particularly with the two-exposure scheme, the two-exposure scheme has come to attract more attention as the FPD has come to be used. Moreover, application of the energy subtraction technology to radiographies of abdominal and neck parts have been under consideration while the energy subtraction technology has already been recognized as effective in its application to the radiography of a chest part. Thus, the energy subtraction technology is expected to have extended range of application in the future.

With the two-exposure scheme, however, since occurrence of time lag between the exposures is inevitable, there is a problem in that artifacts can be generated due to movements of the subject between the exposures. In this respect, conventionally, various methods for reducing such artifacts in connection with the energy subtraction technology particularly in terms of radiography of a chest part with which possible influence of cardiac beat and breathing need to be taken into consideration have been proposed.

For example, there is a kind of a method that adopts a system for synchronizing acquisition of two images of a chest part of a patient with a cardiac cycle including: monitoring the cardiac cycle of the patient for detecting a first cardiac trigger; shooting the patient in response to a detection of the first cardiac trigger to form an X-ray image; monitoring the cardiac cycle of the patient for detecting a second cardiac trigger; recording an offset image; and combining the X-ray and offset images to acquire high quality X-ray image of the patient (cf. Japanese Patent Application Laid-Open No. 2002-325756, etc.). With the method using such system, possible artifacts that can be caused by cardiac motion of the patient are prevented from showing up on the X-ray images.

Furthermore, as an artifact reduction method which could be suitably applied to the energy subtraction process, for example, there is a method in which: shift vectors for respective control points arranged in a matrix are derived by template matching using localized areas of a low energy image in order to perform nonlinear transformation on the low energy image; the low energy image is transformed or distorted to be formed into an aligned low energy image; and the aligned low energy image is registered with a high energy image (cf. Japanese Patent Application Laid-Open No. 2003-244542, etc.). With such method, reduction of possible motion artifacts between the low and high energy images is attempted.

SUMMARY OF THE INVENTION

However, with respect to the artifact reduction method using cardiac synchronization as disclosed in the above-mentioned Japanese Patent Application Laid-Open No. 2002-325756, there is a problem in that the method requires an apparatus for electrocardiographic monitoring which makes the whole apparatus configuration complicated and costing. Moreover, there is another problem in that a delay of about 150 msec can be caused between the electrocardiographic motion and the actual cardiac motion.

In addition, with respect to the artifact reduction method using image processing as disclosed in the above-mentioned Japanese Patent Application Laid-Open No. 2003-244542, there is a problem in that parameters such as intervals among the control points, a template size, etc. are to be determined by a user, which means that the user is required to spend time and effort in specifying proper parameters for each application part and physical frame of the patient. Furthermore, although the method of combining local matching and nonlinear transformation may be effective with respect to the chest part such as a heart that exhibits local motions, it may be troublesome with respect to other parts with less local motions because it may increase the number of calculations to be done which may turn out unnecessary.

It is therefore an object of the present invention to resolve the above-described problems and to provide an energy subtraction method and an energy subtraction apparatus enabling, in performing energy subtraction processes on various parts, acquisition of images with less artifacts regardless of information of body parts of a subject or movements of the body parts.

A first aspect of the present invention provides an energy subtraction apparatus which can accomplish the above-mentioned object, the energy subtraction apparatus comprising: an image input device which inputs two or more different kinds of radiographic images having been taken by irradiating a subject with radiation rays with different radiation qualities; an information of body part acquisition device which acquires a information of body part; a motion compensation processing device which compensates for movement of the subject between the two or more different kinds of radiographic images; a subtraction device which performs an energy subtraction process on the two or more different kinds of radiographic images; and an operation mode switching device which switches an operation mode of the motion compensation processing device depending on the information of body part.

Thus, since it is arranged such that the operation mode of the registration process can be changed depending on the information of body part, images with less motion artifacts can be acquired regardless of information of body parts.

In the present invention, "information of body part(s)" means "for which part (ex. a chest part, an abdominal part, a neck part, limbs, and so forth) of the subject an image is taken". The information may be input upon imaging, or it may be obtained by analyzing a taken image.

According to a second aspect of the present invention, the motion compensation processing device includes a local matching device which performs local matching to find out corresponding points between the two or more different kinds of radiographic images, a deformation parameter calculation device which calculates a shift amount, as a deformation parameter, between each corresponding points between the radiographic images based on an image deformation model that represents a content of image deformation processing, and an image deformation device which deforms the radiographic image based on the calculated deformation parameters; and the operation mode switching device switches registration parameters for use in the local matching.

According to a third aspect of the present invention, the registration parameters include control point intervals among control points being set at predetermined intervals on a specified radiographic image to serve as references in finding out corresponding points between the radiographic images, a size of a template being set on the specified radiographic image in a way including each control point, and a value for a search range being set on a radiographic image other than the specified radiographic image in a way including a point corresponding to the control point.

Thus, since it is arranged such that the registration parameters can also be switched depending on the information of body part, registration that can follow the movement of the part is made possible, and therefore images with less motion artifacts can be acquired regardless of information of body parts.

According to a fourth aspect of the present invention, the motion compensation processing device includes a local matching device which performs local matching to find out corresponding points between the two or more different kinds of radiographic images, a deformation parameter calculation device which calculates a shift amount, as a deformation parameter, between each corresponding points between the radiographic images based on an image deformation model that represents a content of image deformation processing, and an image deformation device which deforms the radiographic image based on the calculated deformation parameters; and the operation mode switching device switches the image deformation model.

Thus, since it is arranged such that the way of image deforming can be switched depending on the information of body part, registration that can follow the movement of the part is made possible, and therefore images with less motion artifacts can be acquired regardless of information of body parts.

According to a fifth aspect of the present invention, the motion compensation processing device includes a local matching device which performs local matching to find out corresponding points between the two or more different kinds of radiographic images, a deformation parameter calculation device which calculates a shift amount, as a deformation parameter, between each corresponding points between the radiographic images based on an image deformation model that represents a content of image deformation processing, and an image deformation device which deforms the radiographic image based on the calculated deformation parameters; and the operation mode switching device switches the operation mode between a case where the information of body part is a chest part and a case where the information of body part is a part other than the chest part.

Thereby, images with less motion artifacts can be acquired regardless of information of body parts.

Furthermore, a sixth aspect of the present invention provides an energy subtraction method which can also accomplish the above-mentioned object, the energy subtraction method comprising: a step of inputting two or more different kinds of radiographic images having been taken by irradiating a subject with radiation rays with different radiation qualities; a step of acquiring an information of body part; a step of compensating for movement of the subject between the two or more different kinds of radiographic images; a step of performing an energy subtraction process on the two or more different kinds of radiographic images; and a step of switching, depending on the information of body part, an operation mode for the step of compensating for shift in pixel position.

Thus, since it is arranged such that the operation mode of the registration process can be changed depending on the information of body part, images with less motion artifacts can be acquired regardless of information of body parts.

According to a seventh aspect of the present invention, the step of compensating for movement of the subject includes a step of performing local matching to find out corresponding points between the two or more different kinds of radiographic images, a step of calculating a shift amount, as a deformation parameter, between each corresponding points between the radiographic images based on an image deformation model that represents a content of image deformation processing, and a step of deforming the radiographic image based on the calculated deformation parameters; and the step of switching an operation mode includes switching registration parameters for use in the local matching.

According to an eighth aspect of the present invention, the registration parameters include control point intervals among control points being set at predetermined intervals on a specified radiographic image to serve as references in finding out corresponding points between the radiographic images, a size of a template being set on the specified radiographic image in a way including each control point, and a value for a search range being set on a radiographic image other than the specified radiographic image in a way including a point corresponding to the control point.

Thus, since it is arranged such that the registration parameters can also be switched depending on the information of body part, registration that can follow the movement of the part is made possible, and therefore images with less motion artifacts can be acquired regardless of information of body parts.

According to a ninth aspect of the present invention, the step of compensating for movement of the subject includes a step of performing local matching to find out corresponding points between the two or more different kinds of radiographic images, a step of calculating a shift amount, as a deformation parameter, between each corresponding points between the radiographic images based on an image deformation model that represents a content of image deformation processing, and a step of deforming the radiographic image based on the calculated deformation parameters; and the step of switching an operation mode includes switching the image deformation model.

Thus, since it is arranged such that the way of image deforming can be switched depending on the information of body part, registration that can follow the movement of the part is made possible, and therefore images with less motion artifacts can be acquired regardless of information of body parts.

According to a tenth aspect of the present invention, the step of compensating for movement of the subject includes a step of performing local matching to find out corresponding points between the two or more different kinds of radiographic images, a step of calculating a shift amount, as a deformation parameter, between each corresponding points between the radiographic images based on an image deformation model that represents a content of image deformation processing, and a step of deforming the radiographic image based on the calculated deformation parameters; and the step of switching an operation mode includes switching the operation mode between a case where the information of body part is a chest part and a case where the information of body part is a part other than the chest part.

Thereby, images with less motion artifacts can be acquired regardless of information of body parts.

Thus, according to the aspects of the present invention as described above, since it is arranged such that the operation mode of the registration process can be changed depending on the information of body part, images with less motion artifacts can be acquired regardless of information of body parts.

DETAILED DESCRIPTION OF THE PREFERRED EMBODIMENTS

Now with reference to the attached drawings, an energy subtraction method and an energy subtraction apparatus according to the present invention will be described in detail.

Figure 1:
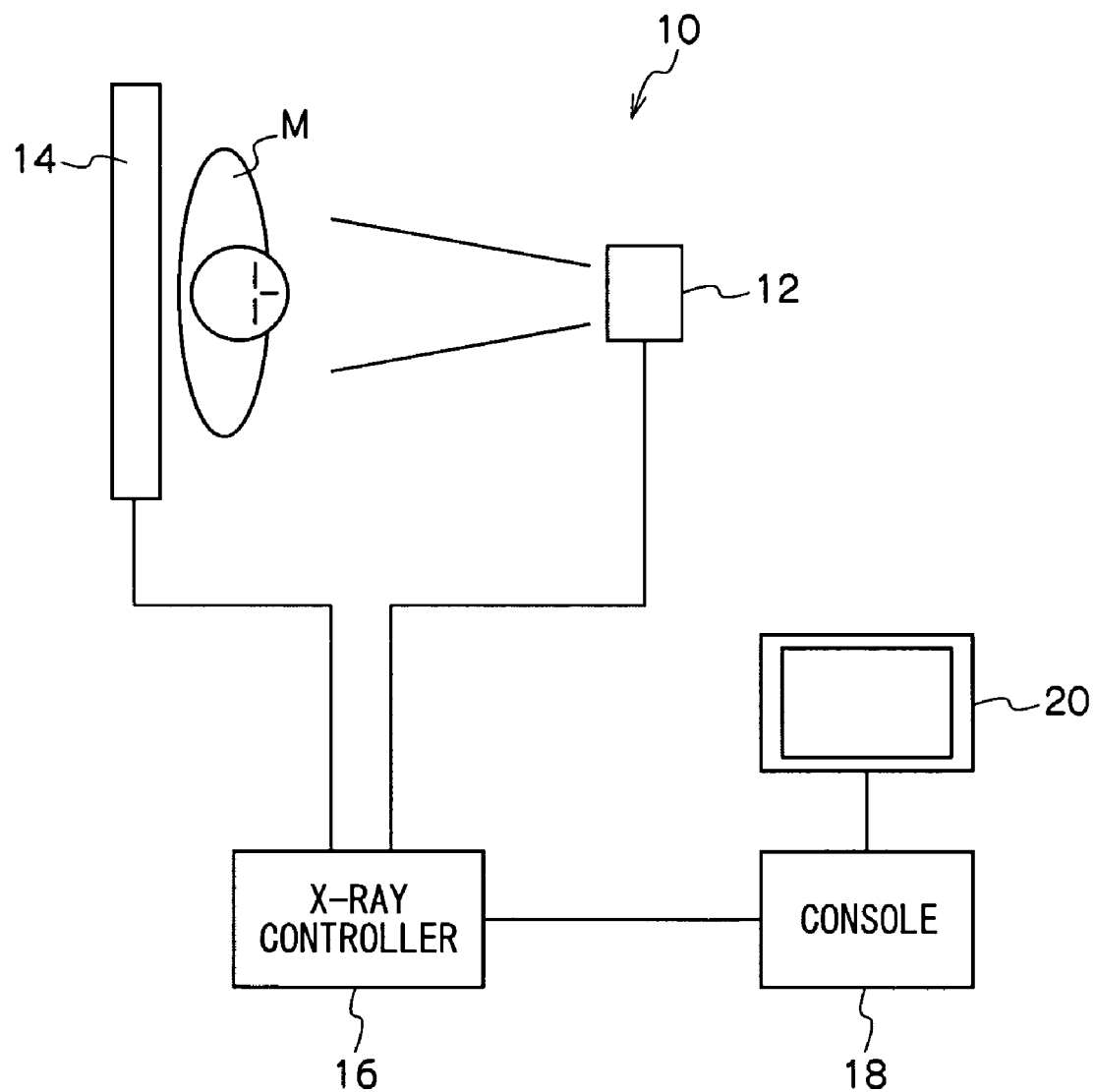
FIG. 1 is a schematic configuration diagram showing one embodiment of an energy subtraction apparatus which implements an energy subtraction method according to the present invention.

FIG. 1 is a schematic configuration diagram showing one embodiment of the energy subtraction apparatus which implements the energy subtraction method according to the present invention.

The energy subtraction apparatus according to the present embodiment configures an X-ray imaging system that uses a flat panel X-ray detector (FPD).

As shown in FIG. 1, an energy subtraction apparatus 10 according to the present embodiment is configured as mainly including an X-ray source 12 which irradiates a subject M with X-ray, a flat panel X-ray detector (FPD) 14 which detects the X-ray having penetrated through the subject M to output the detected result as a detection signal, an X-ray controller 16, and a console 18. The console 18 is connected with a display 20 of which screen takes a form of a touch panel with which an operator can input designated instructions, etc. by touching the panel. In addition, the console 18 may have other input devices such as a keyboard, etc. connected thereto.

Although a detailed explanation of a configuration of the X-ray source 12 will be omitted herein, to be brief, the X-ray source 12 has an X-ray tube for irradiating the subject M with X-ray, with which energy of the X-ray for emission is controlled by predetermined tube voltage and tube current.

The FPD 14 has an acceptance surface formed into a flat-plate shape on the surface thereof. This acceptance surface can have its gradient changed to become horizontal or vertical. With such configuration, the FPD 14 is capable of photoelectrically detect the X-ray having penetrated through the subject M and output the detected result as an analog electric signal.

The output signal (detection signal) of the FPD 14 is to be inputted to the console 18 via the X-ray controller 16.

The X-ray controller 16 controls the X-ray source 12 and the FPD 14 in order to perform X-ray imaging. That is, based on imaging conditions having been inputted or set, the X-ray controller 16 controls the tube voltage of the X-ray source 12 to be a predetermined value in order to perform X-ray imaging at low voltage or high voltage.

The console 18 serves to receive the detection signal from the FPD 14 via the X-ray controller 16, reconstruct a perspective image of a subject, perform an energy subtraction process on the image, and generate a predetermined image to be shown on the display 20.

The display 20, by being operated through its touch panel, may serve as a tool to input imaging menu; input orders for information of body parts, etc.; input imaging conditions for a first image being a regular diagnostic image; and input adjusted values of the imaging conditions in such a case where the shooting conditions are set as predetermined initial values.

The energy subtraction apparatus 10 according to the present embodiment, in executing energy subtraction process on a diagnostic image and a nondiagnostic image, performs registration between the diagnostic image and the nondiagnostic image. In the act of registering the diagnostic image and the nondiagnostic image, the energy subtraction apparatus 10 switches registration processes and registration parameters sets depending on a selection of a information of body part, while the energy subtraction apparatus 10 is provided with a plural kinds of registration processes and registration parameters sets. Such process is performed at the console 18.

Figure 2:
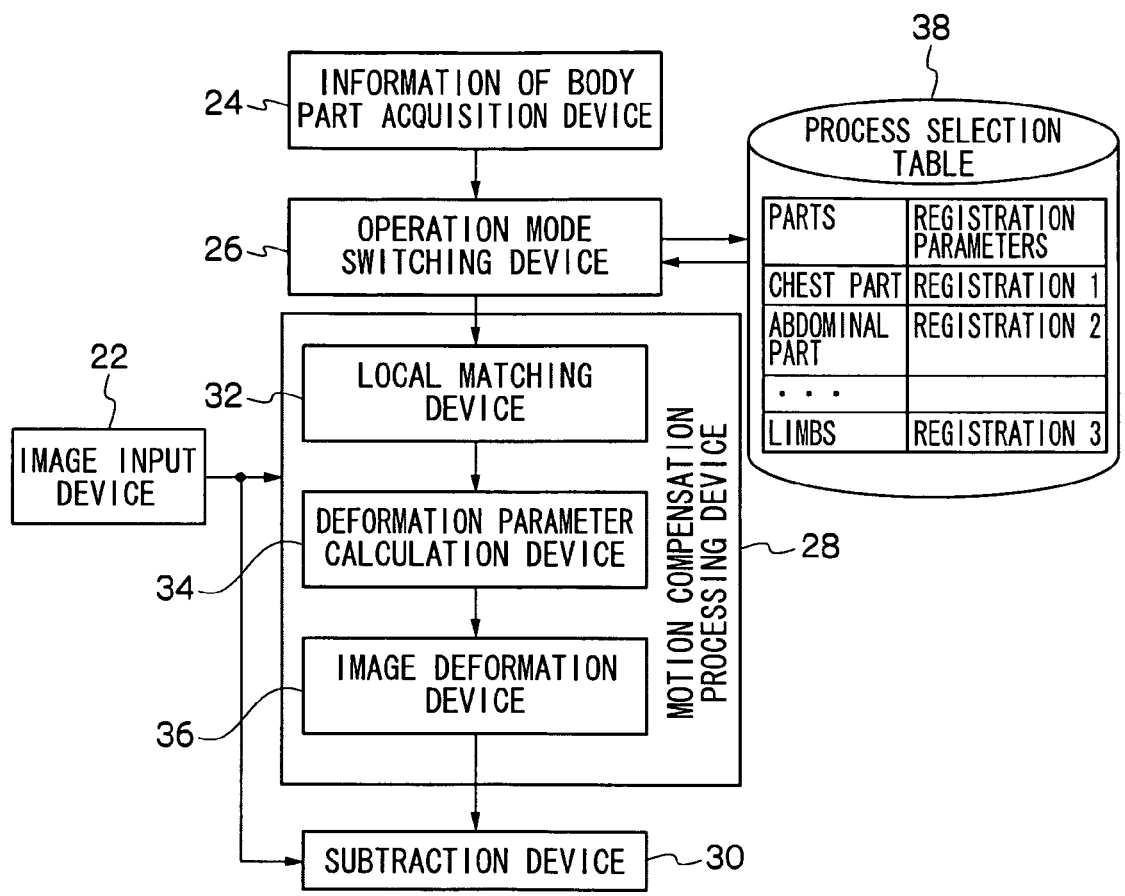
FIG. 2 is a schematic configuration diagram of a console according to the present embodiment shown in FIG. 1.

FIG. 2 shows a configuration of the console 18 according to the present embodiment.

As shown in FIG. 2, the console 18 is configured as including an image input device 22, a information of body part acquisition device 24, an operation mode switching device 26, a motion compensation processing device 28, and a subtraction device 30.

The motion compensation processing device 28 is configured as including a local matching device 32, a deformation parameter calculation device 34, and an image deformation device 36. The operation mode switching device 26 is provided with a process selection table 38.

The image input device 22 serves to receive the detection signal as detected by the FPD 14 via the X-ray controller 16 as an X-ray image, the detection signal being the X-ray having been emitted from the X-ray source 12 toward the subject M and penetrated through the subject M. The energy subtraction process is directed to a diagnostic image having been taken under the same conditions as in a regular diagnosis and a nondiagnostic image having been taken at different energy level (e.g. different level of tube voltage, or the like), and subtraction images are acquired using these two kinds of images.

The image input device 22 receives from the X-ray controller 16 the two kinds of images being the diagnostic image and the nondiagnostic image. For example, in a case when the information of body part is a chest part, because the diagnostic image will be taken at high tube voltage (of about 100 kVp to 150 kVp), the nondiagnostic image, on the contrary, should desirably be taken at low tube voltage (of about 60 kVp to 80 kVp), from a perspective of decomposition precision.

In the present embodiment, although the description will be about a case in which the nondiagnostic image taken for subtraction processing is to be deformed, the subtraction method according to the present invention is not limited to such case, while it is possible to have the diagnostic image deformed instead of the nondiagnostic image.

The information of body part acquisition device 24 serves to receive information on the information of body part as inputted from the display 20 through touch panel operation or keyboard (not shown) operation by the operator. Possible options for the information of body parts are a chest part, an abdominal part, a neck part, limbs, and so forth. The information of body parts are not limited to those just mentioned, while other parts can also be designated as the information of body parts.

The operation mode switching device 26 serves to select an operation mode that corresponds to the information of body part of which information has been acquired by the information of body part acquisition device 24. The operation mode switching device 26 selects the corresponding operation mode by referring to the process selection table 38. Selecting the operation mode, which will be described in more detail later on, can be defined as determining which process model and which parameters set are to be selected.

As shown in the diagram, the process selection table 38 stores registration parameters corresponding to respective parts. For example, the registration parameters are stored as registration 1 for the chest part, registration 2 for the abdominal part, and the like. The registration parameters are determined for each operation mode, and as being part-dependent parameters, they come in a set of values for control point intervals, a size of an ROI template, a search range, and so forth.

Here, the control points can be defined as references used in performing local matching between the nondiagnostic image and the diagnostic image, and these control points are arranged on the nondiagnostic image at predetermined intervals, in a way like grid points, for instance. Such predetermined intervals among the control points are referred to as control point intervals. The ROI (region of interest) template is set around each of the control points on the nondiagnostic image in a way including each of the control points. On the other hand, the search range is set on the diagnostic image with which the nondiagnostic image local matching is performed. This search range is used in the local matching in such a way that the ROI template is shifted within the search rage while taking correlation in order to search for the most suitable position.

The local matching device 32 serves to perform local matching between the nondiagnostic image and the diagnostic image to find out where on the diagnostic image the control points on the nondiagnostic image will be positioned.

The deformation parameter calculation device 34 serves to derive a deformation shift amount (deformation parameter) being a shift amount of each of the control points based on the control points on the nondiagnostic image and corresponding points on the diagnostic image having been obtained by the local matching device 32.

The image deformation device 36 serves to deform the nondiagnostic image by deforming each of the pixels of the nondiagnostic image based on the deformation shift amount (deformation parameter) as derived by the deformation parameter calculation device 34.

Thus, the motion compensation processing device 28 has the local matching device 32, the deformation parameter calculation device 34, and the image deformation device 36. With such configuration, the motion compensation processing device 28 detects how the control points on the nondiagnostic image have shifted if being related to the corresponding points on the diagnostic image, derives the deformation shift amount, and deforms the nondiagnostic image, whereby the shift of pixel position on the nondiagnostic image can be compensated for, and the registration process can be accomplished.

The subtraction device 30 serves to perform an energy subtraction process on the nondiagnostic image having been deformed by the above-described motion compensation processing device 28 and the diagnostic image having been received from the image input device 22 to generate a predetermined X-ray image.

An operation of the present embodiment will be described in the following.

First, an operation mode for switching local deformation parameters (registration parameters) will be described.

Figure 3:
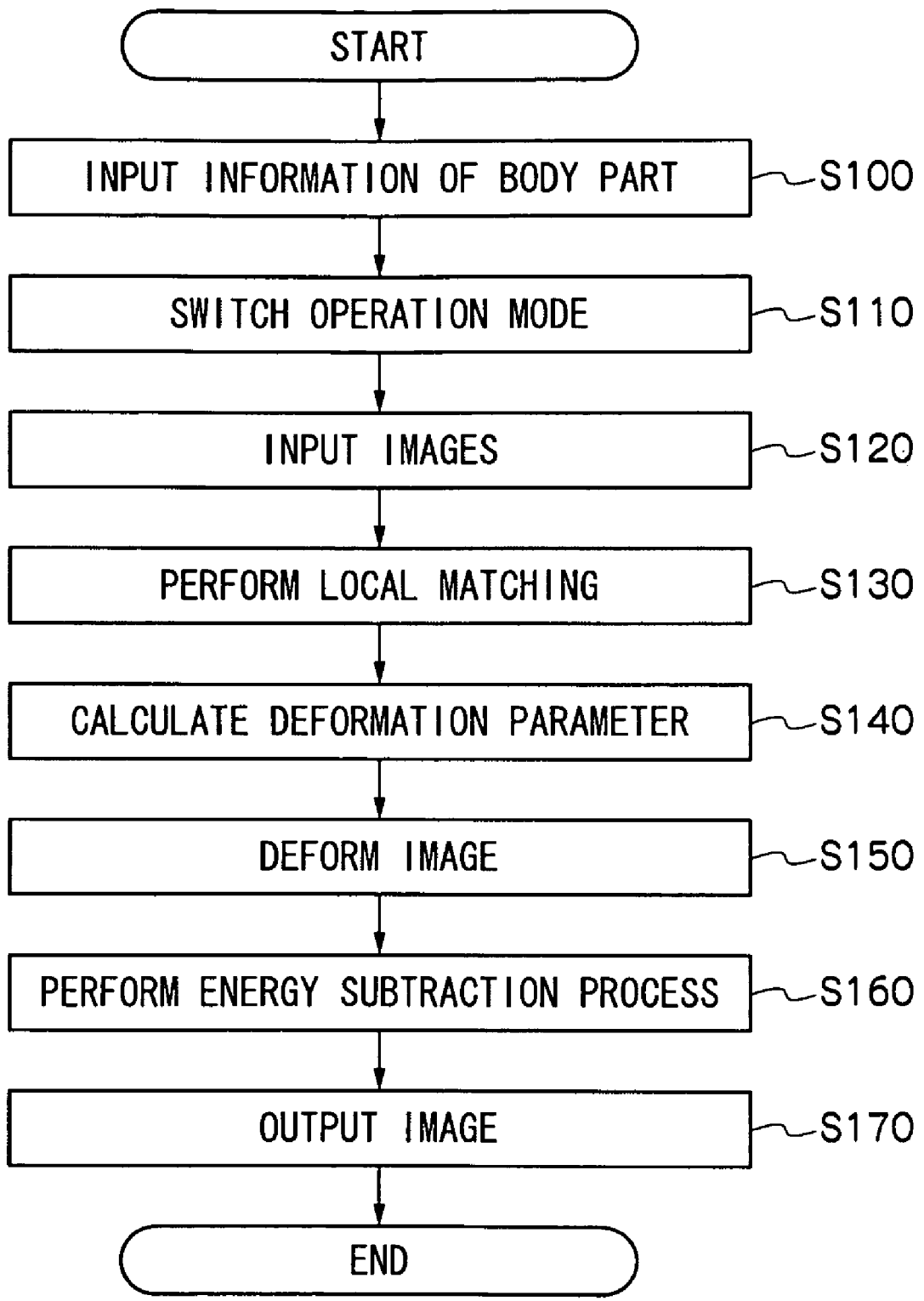
FIG. 3 is a flow chart showing a flow of processes according to the present embodiment.

A flow of processes in this operation mode is shown by a flow chart of FIG. 3.

At step S100 shown in FIG. 3, an operator inputs information on a information of body part. The information of body parts, for example, may be a chest part, an abdominal part, a neck part, limbs, and so forth, although the information of body parts are not limited to such examples. The input of information on the information of body part can be done through operating the touch panel of the display 20 shown in FIG. 1, or can be done thorough an input device such as a keyboard or the like, which is not shown in the figures. The information on the information of body part as inputted by the operator is taken in by the information of body part acquisition device 24.

At step S110, an operation mode is switched. The inputted information on the information of body part is transmitted from the information of body part acquisition device 24 to the operation mode switching device 26. Based on this designated information of body part, the operation mode switching device 26 refers to the process selection table 38 to select the registration parameters that determine the operation mode. As mentioned earlier, the registration parameters are set in the process selection table 38 for each part as part-dependent parameters, and they come in a set of values for control point intervals, a size of an ROI template, a search range, and so forth.

Then at step S120, two kinds of X-ray images as being a diagnostic image and a nondiagnostic image having been taken by the X-ray controller 16 controlling the X-ray source 12 and the FPD 14 are inputted. The nondiagnostic image is inputted to the local matching device 32 and the image deformation device 36, whereas the diagnostic image is inputted to the local matching device 32 and the subtraction device 30.

Then at step S130, a local matching process is performed by the local matching device 32. That is, a registration process is performed on the nondiagnostic image and the diagnostic image.

Figure 4A:
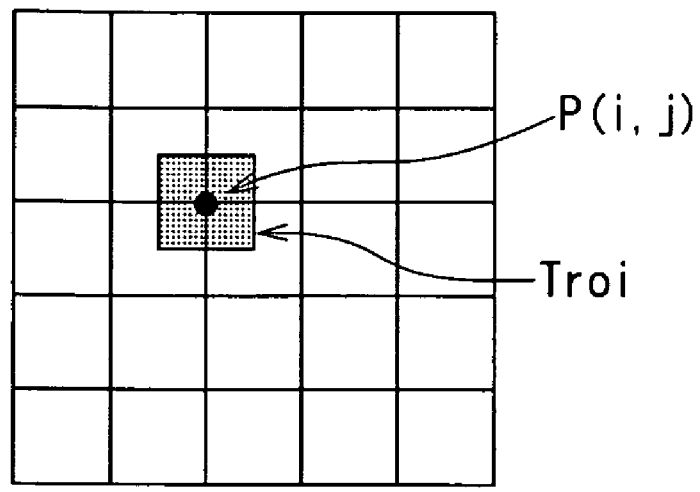
FIGS. 4A and 4B are explanatory diagrams showing aspects of local matching in terms of a nondiagnostic image and a diagnostic image, respectively.
Figure 4B:
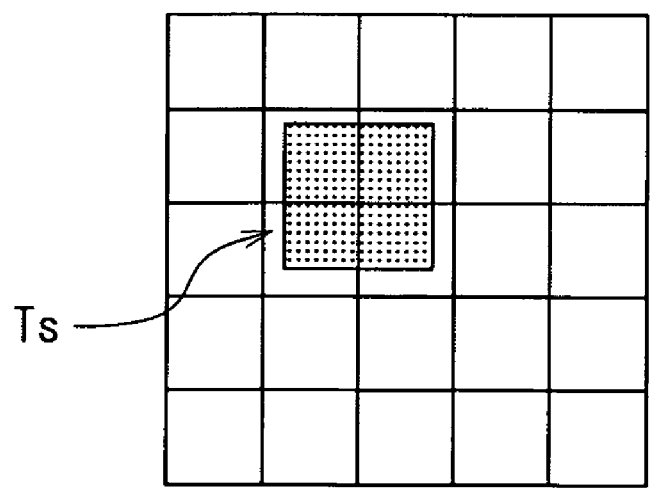

FIGS. 4A and 4B show aspects of local matching. FIG. 4A shows the nondiagnostic image while FIG. 4B shows the diagnostic image. As shown in the diagrams, the nondiagnostic image is divided at predetermined intervals into a form of a matrix, while the diagnostic image is also divided into a form of a matrix in a corresponding manner. As shown in FIG. 4A, each grid point on the nondiagnostic image is representing a control point P (i, j).

An ROI template Troi with respect to the control point P (i, j) is set in a square shape with a predetermined size as including the control point P (i, j) in the center. On the other hand, as shown in FIG. 4B, a search range Ts is set to a predetermined size where a point on the diagnostic image that corresponds to the control point P (i, j) on the nondiagnostic image is centered.

With respect to each position within the search range on the diagnostic image, a matching level is evaluated in terms of normalized cross-correlation, mutual information, and so forth. A position with a maximum matching level is a position P' (i, j) on the diagnostic image that corresponds to the control point P (i, j) on the nondiagnostic image. In this way, by the local matching, registration between each control point P (i, j) on the nondiagnostic image and the corresponding point P' (i, j) on the diagnostic image is performed.

Then at step S140, a deformation parameter is calculated by the deformation parameter calculation device 34. That is, a deformation shift amount S (i, j) is calculated based on a correspondence between each point P (i, j) and point P' (i, j) as acquired in the above process. Then, the deformation shift amount S (i, j) is smoothed. This smoothing process is carried out for the purpose of correcting local errors. Then, a deformation shift amount for each of the pixels other than the control points on the nondiagnostic image is derived by interpolation based on the values as derived for the control points.

Then at step S150, the image deformation device 36 deforms the nondiagnostic image based on the deformation shift amount as derived for each of the pixels of the nondiagnostic image in the above process.

Thus, deformation of the nondiagnostic image is performed. In this respect, however, it is to be arranged such that the registration parameters are switched depending on the part. For example, with respect to the chest part that exhibits local body motions (cardiac beat), it is to be arranged such that the control point intervals are set to be small, the ROI template size is set to be small, and the search range is set to be large. With respect to the parts other than the chest part, it is to be arranged such that the control point intervals are set to be large, the ROI template size is set to be large, and the search range is set to be small.

Specifically, with respect to the chest part, it is desirable that the control point interval is set to be about 4 to 5 mm, the ROI template size is set to be about 5 to 6 mm, and the search range is set to be about 2 to 3 mm. With respect to the parts other than the chest part, it is desirable that the control point interval is set to be equal to or greater than 10 mm, the ROI template size is set to be equal to or greater than 10 mm, and the search range is set to be equal to or less than 1 mm.

With such arrangements, the process will enable such registration with respect to the chest part where local motions such as cardiac beat, etc. can be followed. Moreover, the process will be suitable for such registration with respect to the parts other than the chest part where comparatively global motions such as postural changes, etc. are to be followed.

After the registration and image deformation processes are performed on the nondiagnostic image, the operation proceeds to step S160 where the subtraction device 30 performs an energy subtraction process on the nondiagnostic image having been deformed in the above process and the diagnostic image having been inputted from the image input device 22, whereby a predetermined X-ray image can be obtained.

At step S170, the predetermined X-ray image (subtraction image) as obtained in the above process is outputted to the display 20. The X-ray image may not only be shown on the display 20 but may also be outputted at the same time or alternatively to other recording devices such as a printer, etc.

Next, an operation mode for switching a deformation model will be described.

In this operation mode, the processes subsequent to the processes of acquiring the corresponding position P' (i, j) on the diagnostic image with respect to the control point P (i, j) in a manner similar to steps S100 to S130 of FIG. 3 in the above-described operation mode for switching the local deformation parameters are switched depending on the part.

For example, in a case of a chest part, a deformation process is performed using a free deformation model with which it is possible to follow local motions such as cardiac beat, etc. A free deformation model can move not in whole, as in a case of a lung or a heart, but locally and arbitrary by parts. In this case, the actual deformation processes are similar to the above-described processes at steps S140 to S150 shown in the flow chart of FIG. 3.

That is, by way of local matching, a corresponding position P' (i, j) on the diagnostic image with respect to a control point P (i, j) on the nondiagnostic image is acquired, and then a deformation shift amount S (i, j) is calculated based on a correspondence between these points. Then, the deformation shift amount S (i, j) is smoothed for the purpose of correcting local errors. Then, a deformation shift amount for each of the pixels on the nondiagnostic image is derived by interpolation.

Then, the nondiagnostic image is deformed based on the deformation shift amount as derived for each of the pixels of the nondiagnostic image.

In a case of a part other than the chest part, deformation is performed by executing fitting with a polynomial deformation model with which it is possible to follow comparatively global motions such as postural changes, etc.

At first, by way of local matching, the corresponding position P' (i, j) on the diagnostic image with respect to the control point P (i, j) on the nondiagnostic image is acquired. Then, fitting of the points P (i, j) and P' (i, j) to the polynomial model is executed.

That is, coefficients (deformation coefficients) $a_1, b_1, \ldots, a_2, b_2, \ldots$ of the following polynomial equations are to be acquired in such a way that the error becomes a minimum.

$$x_{ij}' = a_1 + b_1 x_{ij} + c_1 y_{ij} + d_1 x_{ij}^2 + e_1 y_{ij}^2 + f_1 x_{ij} y_{ij} + \ldots$$

$$y_{ij}' = a_2 + b_2 x_{ij} + c_2 y_{ij} + d_2 x_{ij}^2 + e_2 y_{ij}^2 + f_2 x_{ij} y_{ij} + \ldots$$

Here, P (i, j) is to be $(x_{ij}, y_{ij})$, and P' (i, j) is to be $(x_{ij}', y_{ij}')$.

Then, the nondiagnostic image is deformed based on the deformation coefficients.

Moreover, it is possible to arrange plural kinds of registration processes so that the registration process can be switched depending on the part.

For example, the registration process with respect to the chest part can be rendered a dedicated process using a rib motion model, a heart motion model, etc., whereas the registration processes with respect to the other parts may be such processes that use comparatively simple models as the ones described above.

Furthermore, as a specific example of the registration process with respect to the chest part, a rib shape estimation method as disclosed in Japanese Patent Application Laid-Open No. 2006-175057, for example, is known. With the disclosed method: a standard two-dimensional rib shape obtained by a statistical method based on a plurality of rib shapes in two-dimensional chest images having been acquired by a shooting in advance and a plurality of shape deforming vectors for deforming the standard rib shape are stored; a standard three-dimensional rib shape corresponding to the standard two-dimensional rib shape is stored; a parameter of each shape deforming vector for deforming the standard two-dimensional rib shape in a way corresponding to a two-dimensional rib shape of a subject is acquired based on the two-dimensional rib shape of the subject caught in the chest image of the subject having been acquired by the shooting of the subject and on the standard two-dimensional rib shape; and a three-dimensional rib shape of the subject at the time of the shooting of the subject is estimated by deforming the standard three-dimensional rib shape according to the parameter.

It is possible to set, for each part, a dedicated process using such anatomic shape model.

In the energy subtraction process, load subtraction is performed with respect to two or more kinds of radiographic images having been taken at different radiation energy levels. In this respect, for example, by performing subtraction with a certain load that can cancel out a bone image, it is possible to acquire a soft tissue image with the bone image eliminated. However, the energy subtraction process is not limited to such case. The energy subtraction process may include a graininess suppression process as in a case disclosed in Japanese Patent Application Laid-Open No. 03-285475, for example.

Moreover, it is possible to adopt a certain load that can cancel out a reasonable substance or tissue, such as a plaster cast, or the like, other than the bones and soft tissue.

Furthermore, although the energy subtraction process in the above-described embodiment is performed on two kinds of images, the energy subtraction process can also be performed on three or more kinds of images. In addition, the energy subtraction process may be applied for monitoring temporal change.

As described above, according to the present embodiment, a plural kinds of registration processes and registration parameters sets are arranged such that registration processes and registration parameters sets can be switched depending on a selection of a information of body part, and thus acquisition of images with less artifacts is made possible regardless of information of body parts or movements of body parts.

While the embodiment of the energy subtraction method and apparatus according to the present invention has been described in detail herein, it should be understood that the present invention is not intended to be limited by the particular embodiment described, and thus various modifications and changes thereof can be made without departing from the spirit or scope of the invention.

What is claimed is:

1. An energy subtraction apparatus comprising:
   an image input device which inputs two or more different kinds of radiographic images having been taken by irradiating a subject with radiation rays with different radiation qualities;
   an information of body part acquisition device which acquires an information of body part;
   a motion compensation processing device which compensates for movement of the subject between the two or more different kinds of radiographic images;
   a subtraction device which performs an energy subtraction process on the two or more different kinds of radiographic images; and
   an operation mode switching device which switches an operation mode of the motion compensation processing device depending on the information of body part by referring to a process selection table which stores registration parameters corresponding to each of the information of body part.

2. The energy subtraction apparatus according to claim 1, wherein
   the motion compensation processing device includes
      a local matching device which performs local matching to find out corresponding points between the two or more different kinds of radiographic images,
      a deformation parameter calculation device which calculates a shift amount, as a deformation parameter, between each corresponding points between the radiographic images based on an image deformation model that represents a content of image deformation processing, and
      an image deformation device which deforms the radiographic image based on the calculated deformation parameters; and
   the operation mode switching device switches the registration parameters for use in the local matching.

3. The energy subtraction apparatus according to claim 2, wherein
   the registration parameters include
      control point intervals among control points being set at predetermined intervals on a specified radiographic image to serve as references in finding out corresponding points between the radiographic images,
      a size of a template being set on the specified radiographic image in a way including each control point, and
      a value for a search range being set on a radiographic image other than the specified radiographic image in a way including a point corresponding to the control point.

4. The energy subtraction apparatus according to claim 1, wherein
   the motion compensation processing device includes a local matching device which performs local matching to find out corresponding points between the two or more different kinds of radiographic images, a deformation parameter calculation device which calculates a shift amount, as a deformation parameter, between each corresponding points between the radiographic images based on an image deformation model that represents a content of image deformation processing, and an image deformation device which deforms the radiographic image based on the calculated deformation parameters; and the operation mode switching device switches the image deformation model.

5. The energy subtraction apparatus according to claim 1, wherein the motion compensation processing device includes
a local matching device which performs local matching to find out corresponding points between the two or more different kinds of radiographic images, a deformation parameter calculation device which calculates a shift amount, as a deformation parameter, between each corresponding points between the radiographic images based on an image deformation model that represents a content of image deformation processing, and an image deformation device which deforms the radiographic image based on the calculated deformation parameters; and the operation mode switching device switches the operation mode between a case where the information of body part is a chest part and a case where the information of body part is a part other than the chest part.

6. An energy subtraction method for configuring an X-ray imaging system, comprising:

a step of inputting two or more different kinds of radiographic images having been taken by irradiating a subject with radiation rays with different radiation qualities;

a step of acquiring an information of body part;

a step of compensating for movement of the subject between the two or more different kinds of radiographic images;

a step of performing an energy subtraction process on the two or more different kinds of radiographic images; and a step of switching, depending on the information of body part by referring to a process selection table which stores registration parameters corresponding to each of the information of body part, an operation mode for the step of compensating for shift in pixel position, and based on the energy subtraction method, generating an X-ray image which is outputted to a display.

7. The energy subtraction method according to claim 6, wherein the step of compensating for movement of the subject includes a step of performing local matching to find out corresponding points between the two or more different kinds of radiographic images, a step of calculating a shift amount, as a deformation parameter, between each corresponding points between the radiographic images based on an image deformation model that represents a content of image deformation processing, and a step of deforming the radiographic image based on the calculated deformation parameters; and the step of switching an operation mode includes switching the registration parameters for use in the local matching.

8. The energy subtraction method according to claim 7, wherein the registration parameters include control point intervals among control points being set at predetermined intervals on a specified radiographic image to serve as references in finding out corresponding points between the radiographic images, a size of a template being set on the specified radiographic image in a way including each control point, and a value for a search range being set on a radiographic image other than the specified radiographic image in a way including a point corresponding to the control point.

9. The energy subtraction method according to claim 6, wherein the step of compensating for movement of the subject includes a step of performing local matching to find out corresponding points between the two or more different kinds of radiographic images, a step of calculating a shift amount, as a deformation parameter, between each corresponding points between the radiographic images based on an image deformation model that represents a content of image deformation processing, and a step of deforming the radiographic image based on the calculated deformation parameters; and the step of switching an operation mode includes switching the image deformation model.

10. The energy subtraction method according to claim 6, wherein the step of compensating for movement of the subject includes a step of performing local matching to find out corresponding points between the two or more different kinds of radiographic images, a step of calculating a shift amount, as a deformation parameter, between each corresponding points between the radiographic images based on an image deformation model that represents a content of image deformation processing, and a step of deforming the radiographic image based on the calculated deformation parameters; and the step of switching an operation mode includes switching the operation mode between a case where the information of body part is a chest part and a case where the information of body part is a part other than the chest part.

* * * * *